July 21, 1931.   J. H. GRAY   1,815,773
MOTOR VEHICLE ATTACHMENT
Filed May 4, 1929
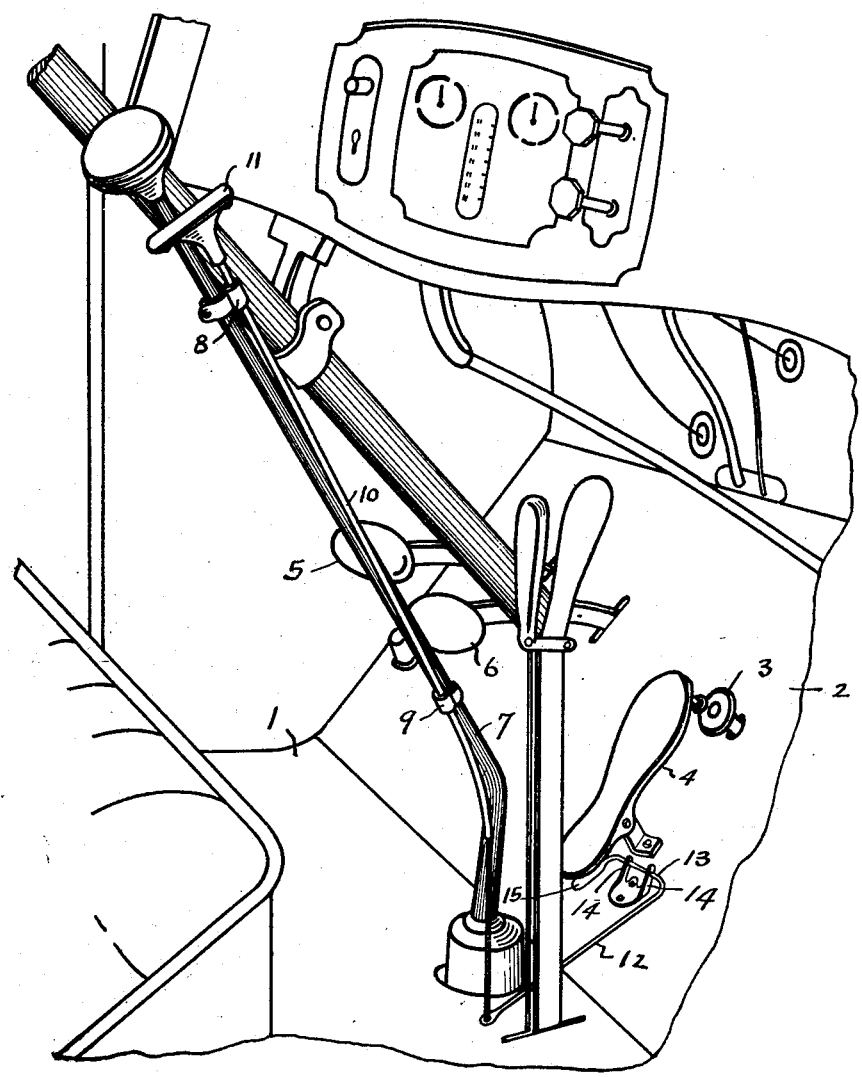
Joseph H. Gray Inventor
By Hardway Cathey Attorneys Patented July 21, 1931

1,815,773

UNITED STATES PATENT OFFICE

JOSEPH H. GRAY, OF HOUSTON, TEXAS, ASSIGNOR OF ONE-HALF TO JOSEPH C. HURLEY

MOTOR VEHICLE ATTACHMENT

Application filed May 4, 1929. Serial No. 360,414.

This invention relates to new and useful improvements in a motor vehicle attachment.

One object of this invention is to provide an attachment of the character described which is associated with the gear shift lever and the accelerator of a motor vehicle and through which the accelerator may be manually operated to control the supply of fuel to the motor, and through which said fuel supply may also be controlled by the foot of the operator.

In driving a motor vehicle it is customary to control the accelerator through the foot of the operator, but at times, particularly when driving in traffic, the operator in controlling the clutch and brake pedals can not also operate the accelerator by foot, and under such conditions, the device hereindescribed may be employed for feeding the fuel to the motor as needed by hand.

Another object of the invention is to provide an attachment of the character described which is so located with reference to the gear shift lever that the operator may control the fuel supply with the same hand with which he operates said lever to shift gears when a change in speed becomes necessary.

With the above and other objects in view the invention has certain particular relation to certain novel features of construction, operation and arrangement of parts, an example of which is given in this specification and illustrated in the accompanying drawing wherein the figure shows a fragmentary perspective view of the vehicle and showing the attachment applied thereto.

Referring now more particularly to the drawing the numeral 1 designates the motor vehicle as a whole, having the foot board 2. The vehicle is equipped with the usual accelerator lever 3, through which the supply of fuel to the motor may be controlled by the foot of the operator. There is a pivotally mounted foot rest 4 on the foot board shaped to form a convenient support for the foot of the operator and located with the toe of said foot support over the accelerator 3. The numerals 5 and 6 designate the clutch and brake pedals respectively, and the numeral 7 designates the shift lever through which transmission gears may be shifted in changing speeds. Mounted in suitably aligned bearings 8 and 9 on the gear shift lever 7 there is a control rod 10 whose upper end carries a transverse grip member 11 and whose lower end is connected to the rear end of the actuating rod 12. The other end of the rod 12 is over turned forming the transverse portions 13, which work through the transversely aligned bearings 14, 14, and the free end 15 of said over turned portion is turned rearwardly underneath the heel of the foot rest.

Under conditions where the operator is not able to control, by foot, the fuel supply, the hand grip 11 may be pulled upwardly, and this will operate, through the mechanism described to operate the foot rest 4 which will in turn actuate the accelerator lever 3 and the supply of fuel to the motor may thus be accelerated, and this result may be effected while manipulating the gear shift lever as the nature of the case may require.

A preferred form of the attachment has been shown and described by way of illustration only, while the broad principle of the invention will be defined by the appended claims.

What I claim is:

1. In a motor vehicle having a fuel feed controlling device and a gear shifting lever; a pivoted foot lever associated with and overlying said controlling device and through which the same may be operated, a manually operable control rod on said shifting lever and operative connections between said rod and foot lever, and independent of said foot lever, whereby the latter may be operated from the rod to operate said feed controlling device.

2. In a motor vehicle having an accelerator and a gear shifting lever; a foot lever through which the accelerator may be operated, a manually operable control rod mounted on the shifting lever, and operative connections between said control rod and said foot lever whereby the latter may be operated from the former said connections including an actuating rod having an overturned end arranged to engage and actuate said foot lever.

3. In a motor vehicle having an accelerator and a shift lever, a lever operative through the foot of the operator and through which said accelerator may be operated, a manually operable control rod associated with the shift lever, and operative connections between said rod and said foot lever whereby the latter may be operated from the former to actuate said accelerator said connections including a pivotally mounted actuating rod one end of which is connected to the control rod and whose other end is overturned and engageable with said foot lever.

4. In a motor vehicle having a fuel feed controlling device and a gear shifting lever, a pivoted foot lever associated with and overlying said controlling device and through which the same may be operated, a manually operable rod on said shifting lever and operative connections between said rod and foot lever, whereby the latter may be operated from the rod to operate said feed controlling device.

In testimony whereof I have signed my name to this specification.

JOSEPH H. GRAY.